United States Patent
Waldo et al.

(10) Patent No.: US 9,146,789 B2
(45) Date of Patent: Sep. 29, 2015

(54) METHOD AND APPARATUS FOR GENERATING AND USING LOCATION-INDEPENDENT DISTRIBUTED OBJECT REFERENCES

(75) Inventors: James H. Waldo, Dracut, MA (US); Timothy J. Blackman, Arlington, MA (US); Daniel J. Ellard, Belmont, MA (US); Robert F. Sproull, Newton, MA (US); Jane A. Loizeaux, Lowell, MA (US); Michael P. Warres, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 2304 days.

(21) Appl. No.: 11/385,164

(22) Filed: Mar. 21, 2006

(65) Prior Publication Data

US 2007/0226758 A1    Sep. 27, 2007

(51) Int. Cl.
*G06F 9/54* (2006.01)
*G06F 9/46* (2006.01)

(52) U.S. Cl.
CPC ............... *G06F 9/548* (2013.01); *G06F 9/465* (2013.01); *G06F 2209/463* (2013.01)

(58) Field of Classification Search
USPC ................. 709/203–205, 242–245; 713/167; 707/103 R–103 Z; 719/310, 316, 330
See application file for complete search history.

(56) References Cited

U.S. PATENT DOCUMENTS

| | | | |
|---|---|---|---|
| 5,291,593 A * | 3/1994 | Abraham et al. | 707/103 R |
| 5,740,428 A | 4/1998 | Mortimore et al. | |
| 5,761,499 A * | 6/1998 | Sonderegger | 707/10 |
| 5,903,725 A * | 5/1999 | Colyer | 709/203 |
| 5,914,938 A | 6/1999 | Brady et al. | |
| 5,950,207 A | 9/1999 | Mortimore et al. | |
| 6,018,805 A * | 1/2000 | Ma et al. | 714/4 |
| 6,185,611 B1 | 2/2001 | Waldo et al. | |
| 6,263,330 B1 | 7/2001 | Bessette | |
| 6,418,447 B1 * | 7/2002 | Frey et al. | 707/103 R |
| 7,240,246 B2 | 7/2007 | Wei | |
| 7,519,631 B2 | 4/2009 | Roybal et al. | |
| 7,578,432 B2 | 8/2009 | Libin et al. | |
| 7,761,580 B2 | 7/2010 | Zou | |
| 7,904,488 B2 | 3/2011 | Hood | |

(Continued)

OTHER PUBLICATIONS

Lu—Jini Lookup Service Specification Jun. 7, 2006 10 Pages Version 1.1 USA.

(Continued)

*Primary Examiner* — Shih-Wei Kraft
(74) *Attorney, Agent, or Firm* — Brooks Kushman P.C.

(57) ABSTRACT

Location-independent references include a live reference containing a location of a remote object and a universally unique identifier (UUID) which provides a unique global reference to that remote object. If a method call to the remote object using the live reference fails, the UUID is used to obtain a new reference to the remote object and the new reference is then used to make another method call. A new reference can be obtained from an identifier directory that contains a mapping between UUIDs and location-independent references. When a remote object is first created, or when a remote object is moved from one location to another, the remote object registers with any and all such directories that it can find in its environment. These registrations are leased; that is, if they are not occasionally refreshed by the remote object which registered them, they are dropped from the directory.

10 Claims, 6 Drawing Sheets

(56) References Cited

U.S. PATENT DOCUMENTS

| | | | |
|---|---|---|---|
| 8,117,443 | B1 | 2/2012 | Waldo et al. |
| 2002/0064279 | A1 | 5/2002 | Uner |
| 2003/0097380 | A1 | 5/2003 | Mulhern et al. |
| 2004/0002979 | A1 | 1/2004 | Seguin et al. |
| 2004/0205104 | A1 | 10/2004 | Harvey et al. |
| 2005/0144536 | A1 | 6/2005 | Wei |
| 2006/0004822 | A1 | 1/2006 | Kim et al. |
| 2006/0020578 | A1 | 1/2006 | Hood |
| 2006/0074876 | A1 | 4/2006 | Kakivaya et al. |
| 2006/0168243 | A1 | 7/2006 | Zou |
| 2007/0211892 | A1 | 9/2007 | Ohkoshi |
| 2007/0226758 | A1 | 9/2007 | Waldo et al. |

OTHER PUBLICATIONS

The Digital Object Identifier System May 10, 2006 2 Pages USA http://www.doi.org.

R. Moats URN Syntax May 1997 8 Pages USA.

P. Mockapetris Domain Names—Concepts and Facilities Nov. 1987 52 Pages USA.

Sun Microsystems, Inc., "Stream Unique Identifiers," Java Object Serialization Specification, 1999. Available at http://web.archive.org/web/20000824010049/java.sun.com/j2se/1.3/docs/guide/serialization/spec/class.doc6.html. Downloaded Jun. 11, 2009.

Leach, P.J. and Salz, R., UUIDS and GUIDS, Internet-Draft, Feb. 4, 1998, pp. 1-29, http://www.ics.uci.edu/~ejw/authoring/uuid-guid/draft-leach-uuids-guids-01-txt.

Paskin, N., The DOI (Registered) Handbook, Edition 4.2.0, International DOI Foundation, Inc., Oxford, UK, Feb. 2005, http://www.doi.org.

Unique Local IPv6 Unicast Addresses, R. Hinden, B. Haberman, Internet-Draft, draft-ietf-ipv6-unique-local-addr-06.txt, Sep. 24, 2004.

United States Patent and Trademark Office, Office Action for U.S. Appl. No. 11/243,892 mailed Jan. 16, 2009.

United States Patent and Trademark Office, Final Office Action for U.S. Appl. No. 11/243,892 mailed Jun. 15, 2009.

United States Patent and Trademark Office, Notice of Allowance and Fee(s) Due for U.S. Appl. No. 11/243,892 mailed Nov. 4, 2011.

* cited by examiner

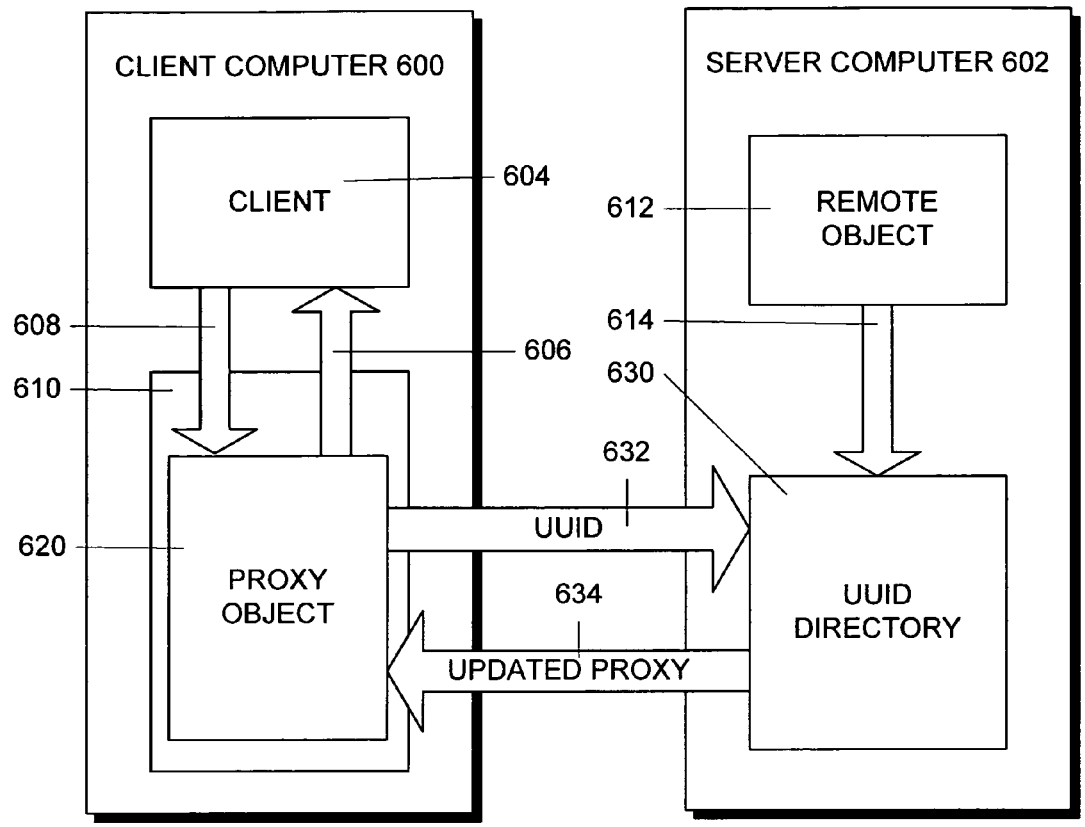
*FIG. 6*
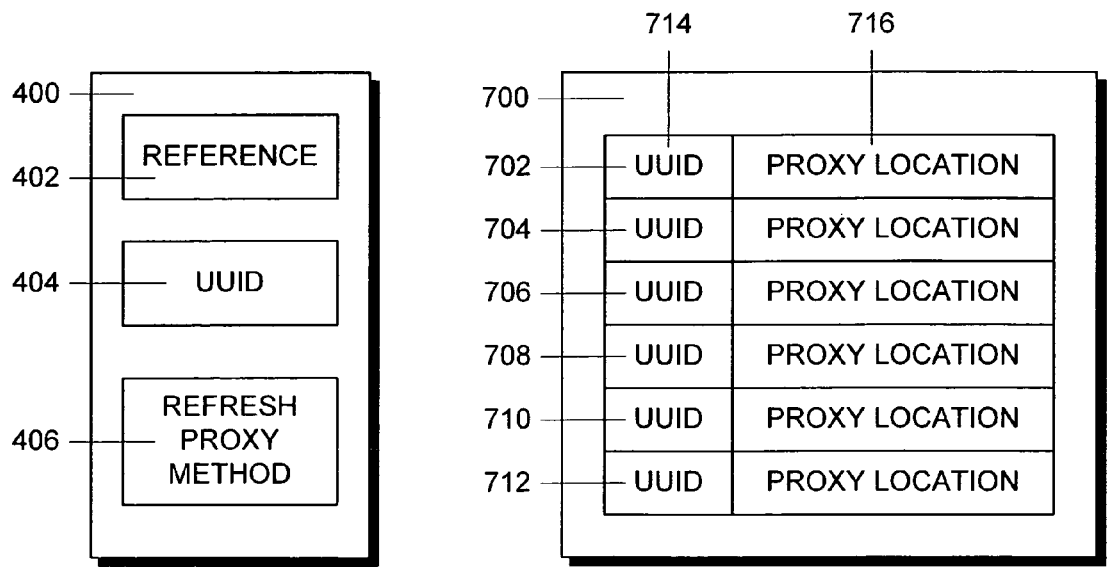
*FIG. 4*  *FIG. 7*

METHOD AND APPARATUS FOR GENERATING AND USING LOCATION-INDEPENDENT DISTRIBUTED OBJECT REFERENCES

BACKGROUND

In a conventional distributed object computing system, such as that illustrated in FIG. 1, a client program 104, operating in a client computer 100, often makes a method call on a remote object 108 located in a server computer 102 by means of a reference 106 to that object 108. Specifically, the client program 104 makes a method call on the reference 106 as indicated schematically by arrow 110. The reference 106, in turn, marshals any parameters involved in the call, initiates contact with the remote object 108, makes the method call on that object as indicated schematically by arrow 114. If a response is returned from the remote object 108, as indicated schematically by arrow 116, the reference 106 un-marshals any return values and returns the response to the client 104 as indicated schematically by arrow 112.

In order to operate in this manner, the reference 106 must be able to locate the remote object 108 to which it refers. In standard remote procedure call systems, like Java™ RMI (Java is a trademark of Sun Microsystems, Inc.) or CORBA, the simplest form of reference 106 contains a record of the machine 102 on which the remote object 108 resides and the port number on which that object 108 is listening for method calls. More complex references in such remote procedure call systems, such as those that allow object activation, include not only a reference containing a machine and port number (sometimes called an "active reference") but also a secondary reference to some object that, if a method call to the active reference fails because the remote object cannot be located, can be contacted to obtain a more current active reference to the original remote object (obtained, perhaps, by actually starting up that object). This secondary reference is also called an active reference, but it is an active reference to a different object that is assumed to be highly available. Thus, even this secondary reference contains information that ties that reference to a particular location on the network.

These conventional remote procedure call mechanisms closely tie the identity of a remote object 108 with the location of that object (or the location of a third-party object, which in turn can locate the referenced object). Such mechanisms only work for remote objects 108 that stay in one location. If the object 108 is moved to a different machine, the reference 106 will be unable to determine the machine on which the remote object 108 now resides, and thus will be unable to make a method call on the object 108. There have been proposals to allow such object movement if the remote object 108 leaves behind a forwarding address (sometimes called a "tombstone"), but even these mechanisms will fail if the machine 102 contained in the active reference no longer exists (or, more precisely, no longer exists on the network).

Some systems must deal with remote objects that are moved over their lifetime and which may be moved from a machine that is later disconnected from the network. Thus, there is a need for a reference to a remote object that will allow a client to find that object even if the object has been moved. Further, since the reference cannot be assured of being informed at the time the object is moved; the reference must be able to determine that an object has moved and what the new location of an object is when that object is needed.

SUMMARY

Location-independent references constructed in accordance with the principles of the invention contain a proxy object that, in turn, includes a live reference containing a location of the referenced remote object and a universally unique identifier (UUID) which provides a unique global reference to that remote object. If a method call to the remote object using the live reference fails, the UUID is used to obtain a new reference to the remote object and the new reference is then used to make another method call.

In one embodiment, at least one identifier directory is provided that contains a mapping between UUIDs and location-independent references. When a remote object is first created, or when a remote object is moved from one location to another, the remote object registers with any and all such directories that it can find in its environment. These registrations are leased; that is, if they are not occasionally refreshed by the remote object which registered them, they are dropped from the directory. A client first makes a method call on the remote object using the location-independent reference and, if the method call fails, the client uses the UUID contained in the reference to access any of the identifier directories that it can locate. A successful access of such a directory allows the client to retrieve a new location-independent reference including an updated live reference based on the current location (as registered) of the remote object.

In another embodiment, the client uses a method in the location independent reference to access the identifier directories.

In yet another embodiment, the client provides the location of an identifier directory to the method in the location independent reference as a hint to facilitate the location of identifier directories.

In still another embodiment, the location independent reference contains hints to facilitate the location of identifier directories.

In still another embodiment, the client directly accesses the identifier directories in order to retrieve a new location-independent reference including an updated live reference based on the current location of the remote object.

In a further embodiment, when the location-independent reference determines that a method call to a remote object has failed because the remote object cannot be located, the location-independent reference informs the client that the remote object has been moved whereupon the client attempts to obtain a new location-independent reference.

In still another embodiment, the location-independent reference informs the client that the remote object has been moved by generating a special exception.

BRIEF DESCRIPTION OF THE DRAWINGS

FIG. 4 is a block schematic diagram illustrating a client calling a method on a remote object by means of a reference that includes a proxy object that refers to the remote object.

FIG. 6 is a block schematic diagram that illustrates the internal components of a proxy object.

FIG. 7 is a block schematic diagram that illustrates the internal components of a UUID dictionary.

DETAILED DESCRIPTION

The first step in constructing location-independent references is to separate the location of a remote object from the identity of that object. This can be done by assigning a UUID to an object at the time the object is created. This UUID can be created by a variety of known techniques including the UUID mechanism used in the Java language and the UUID mechanism described in the Network Working Group, Internet draft, "UUIDs and GUIDs", P. J. Leach and R. Salz, Feb. 4, 1998. In one embodiment, these UUIDs are generated using a variety of algorithms and the algorithms are themselves encoded into the UUIDs. Each UUID includes two parts: a first part that is an identifier, which is unique to the second part. The second part identifies the algorithm that was used to generate the identifier. Thus, the uniqueness of the identifier is based on how the identifier was created not the entity that created the identifier.

Figure 2:
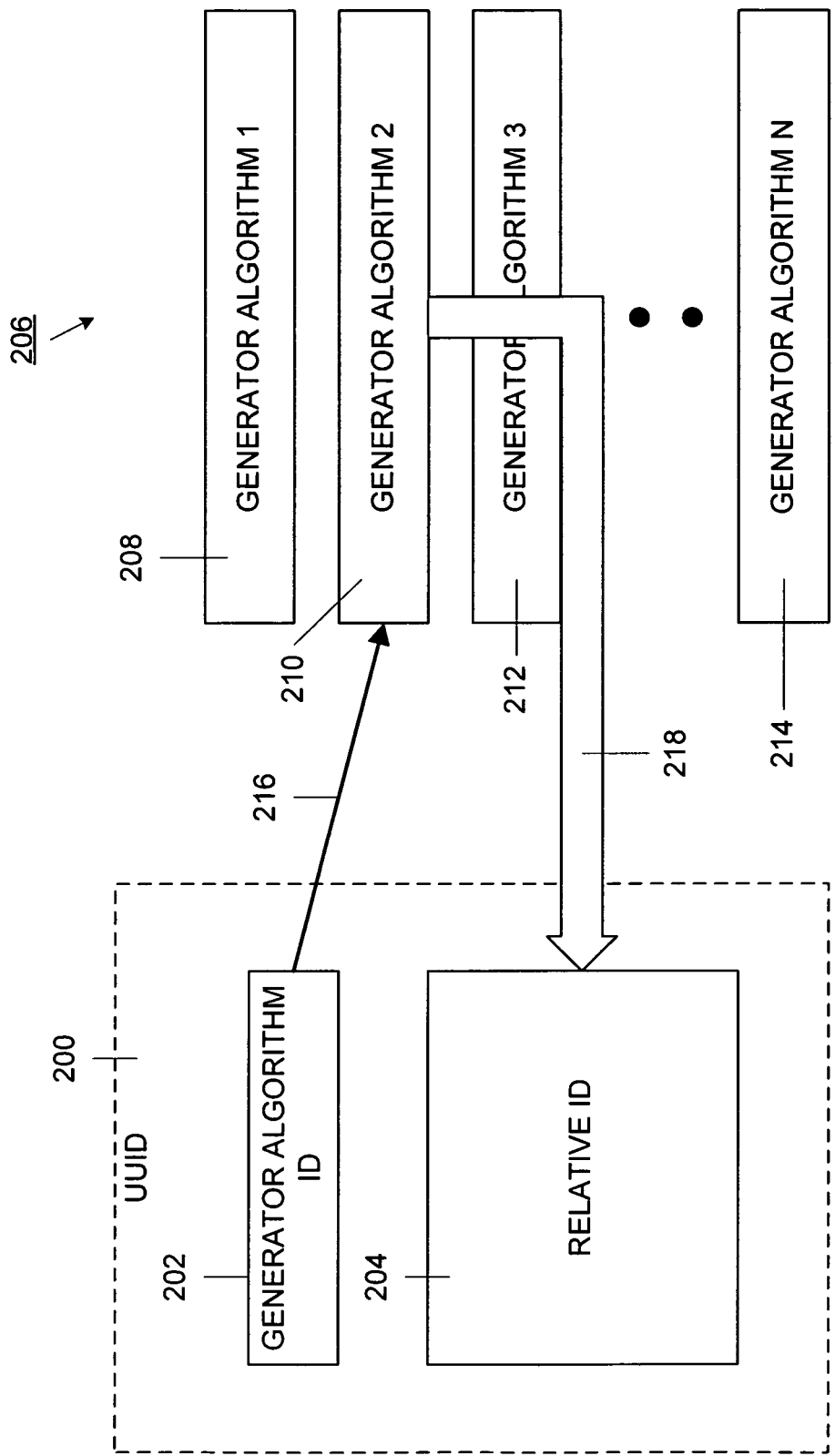
FIG. 2 is a block schematic diagram of an illustrative UUID illustrating the manner of generating the UUID.

The basic structure of a UUID 200 constructed in this manner is shown in FIG. 2. In particular, the UUID consists of a generator algorithm ID 202 and a relative ID 204. The relative ID 204 is generated by one of a set of generator algorithms 206 of which generator algorithms 208-214 are shown. As illustrated in FIG. 2, relative ID 204 is generated by generator algorithm 2 (210) as schematically illustrated by arrow 218. The generator algorithm that generated the relative ID for a UUID is identified in the UUID by a generator algorithm ID. For example, generator algorithm 210 that generated relative ID 204 is identified in UUID 200 by generator algorithm ID 202.

Figure 3A:
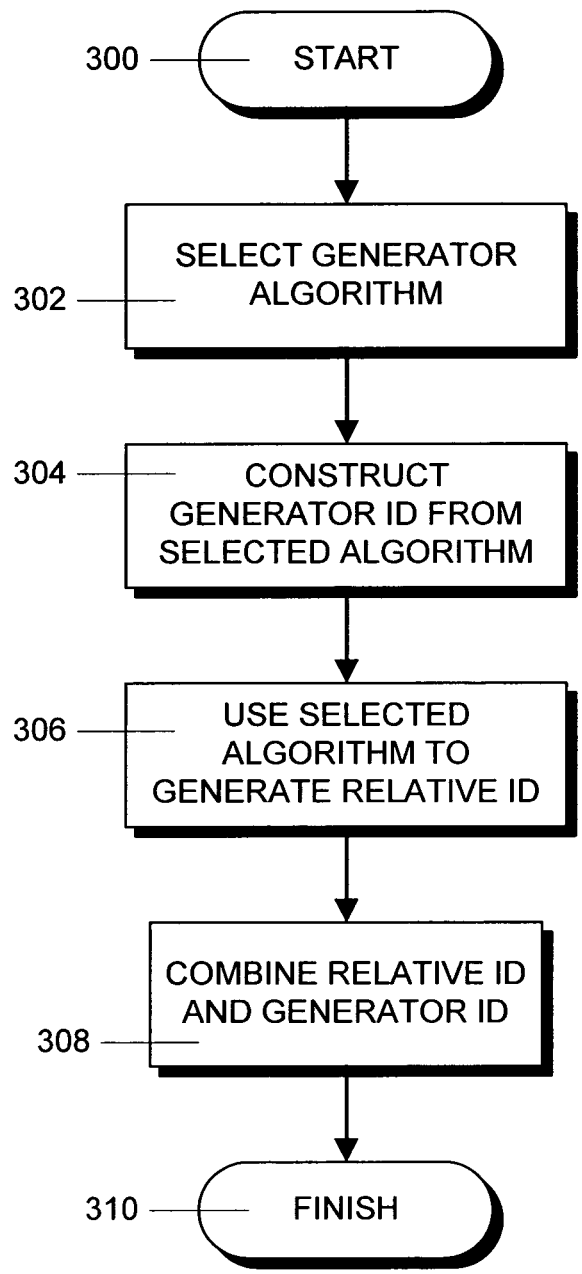
FIG. 3A is a flowchart that shows the steps in an illustrative process for generating a UUID having both a generator algorithm ID and a relative ID in accordance with the principles of the invention.
Figure 3B:
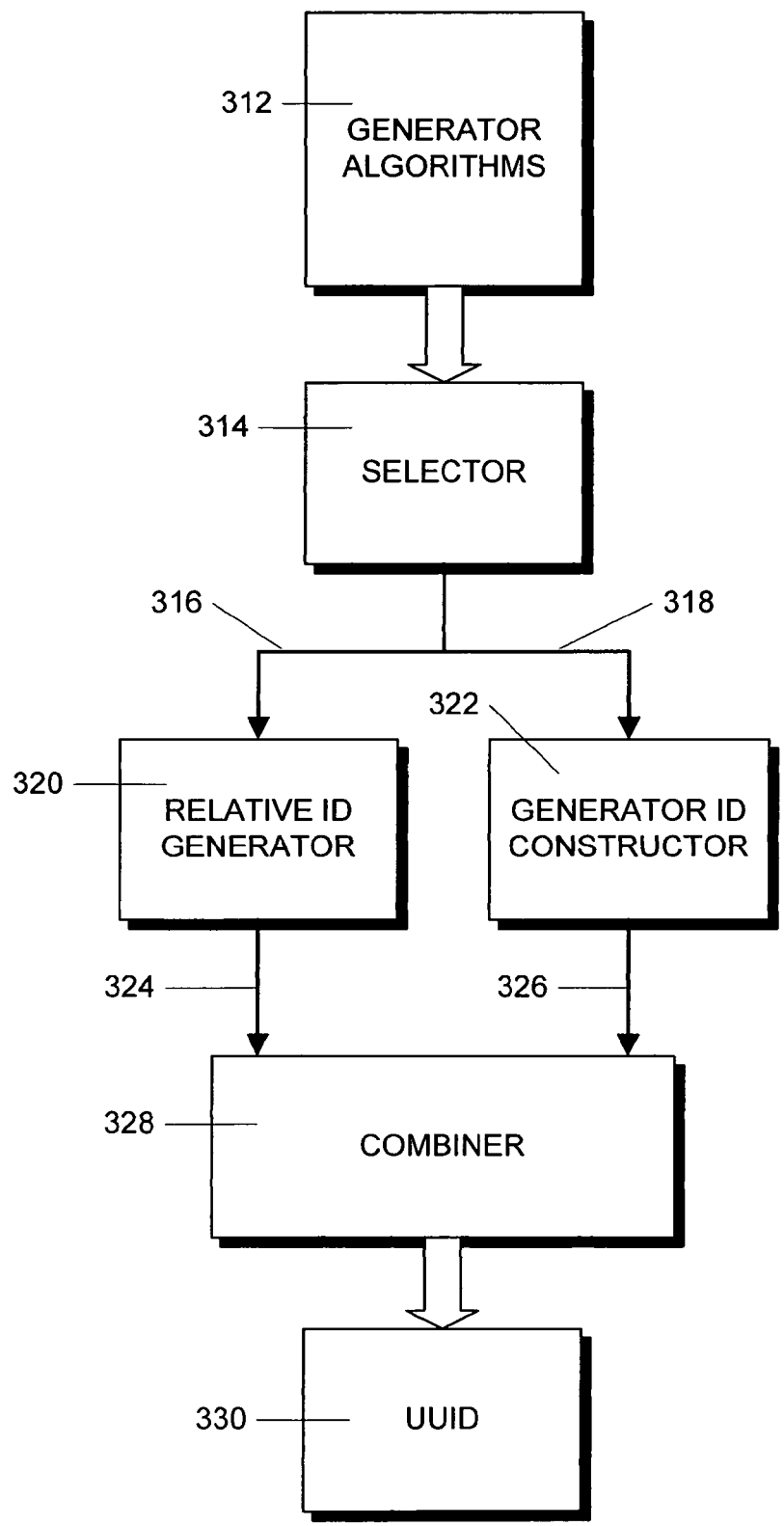
FIG. 3B is a block schematic diagram illustrating an apparatus for generating a UUID using the process as set forth in FIG. 2A.

The process of generating a new UUID is illustrated in the flowchart in FIG. 3A and an illustrative apparatus for generating the UUID is shown in FIG. 3B. This process begins with step 300 and proceeds to step 302 where a generator algorithm for the UUID is selected from a set of generator algorithms 312 by means of a selector 314. The selector 314 might be a computer, but could also be administrative personnel who are constructing a system that uses the UUID. The selected algorithm is provided, as indicated schematically by arrows 316 and 318, to a relative ID generator 320 and a generator ID constructor 322. In step 304, an ID for the generator algorithm is constructed by the generator ID constructor 322, if necessary. Next, in step 306, the selected generator algorithm is used by the relative ID generator 320 to generate the relative ID 204. The generated relative ID is provided to a combiner 328 as indicated by arrow 324 and the generator algorithm ID is also provided, as indicated by arrow 326, to combiner 328. In step 308, the combiner combines the two IDs to generate the UUID 330 and the process finishes in step 310. The construction and generation of UUIDs in accordance with the above technique is discussed in more detail in U.S. patent application Ser. No. 11/243,892, filed on Oct. 5, 2005 and assigned to the same assignee as the present invention. The contents of this application are incorporated in their entirety into the present application by reference.

A remote object that is identified by such a UUID exports itself as a location-independent proxy object 400 as illustrated in FIG. 4. Such a proxy object 400 is an extension of the usual notion of a reference to a remote object. A location-independent proxy object 400 for a particular remote object implements a service interface to that remote object, allowing clients holding the reference to make method calls on that object through the proxy object. There are many techniques for implementing this service interface. In one embodiment, the location-independent proxy object 400 contains a conventional reference 402 to the remote object that depends on the location of that object. Such a reference could be a Java™ Remote Method Invocation-Java Remote Method Protocol (RMI-JRMP) proxy object (either activatable or non-activatable) or a Jini™ Extended Remote Invocation (Jini™ ERI) remote reference (Jini is a trademark of Sun Microsystems, Inc.). The proxy object 400 also includes the UUID 404 and a refreshProxy method 406 that, as described below will be used to retrieve an updated proxy object when a method call made using proxy object 400 fails.

Figure 1:
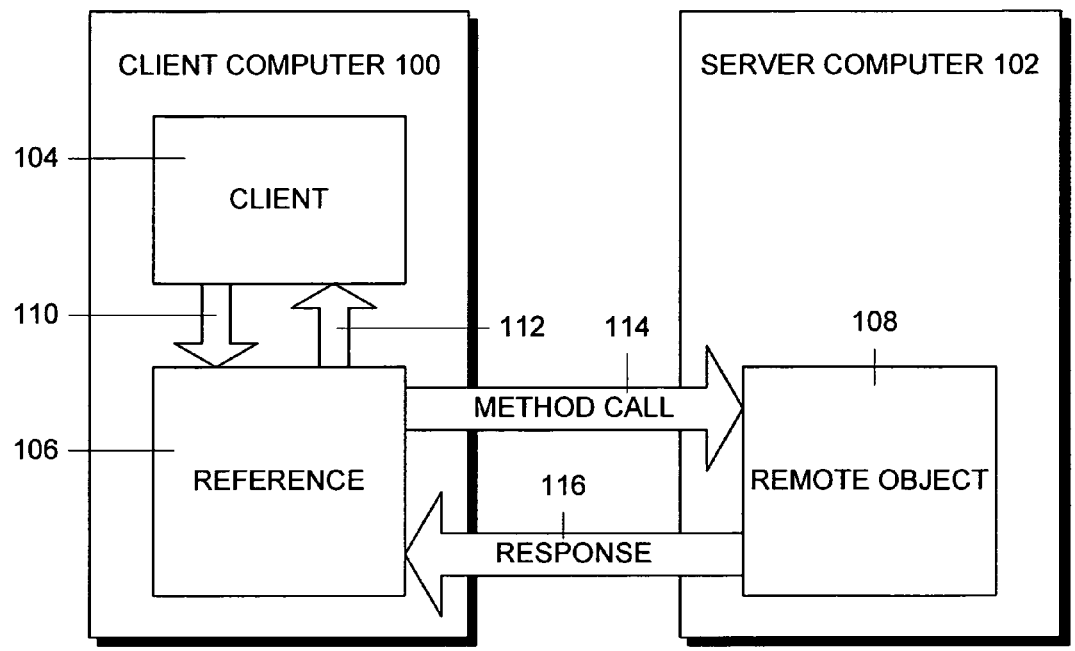
FIG. 1 is a block schematic diagram illustrating a conventional operation in which a client calls a method on a remote object by means of a reference to that remote object.
Figure 5:
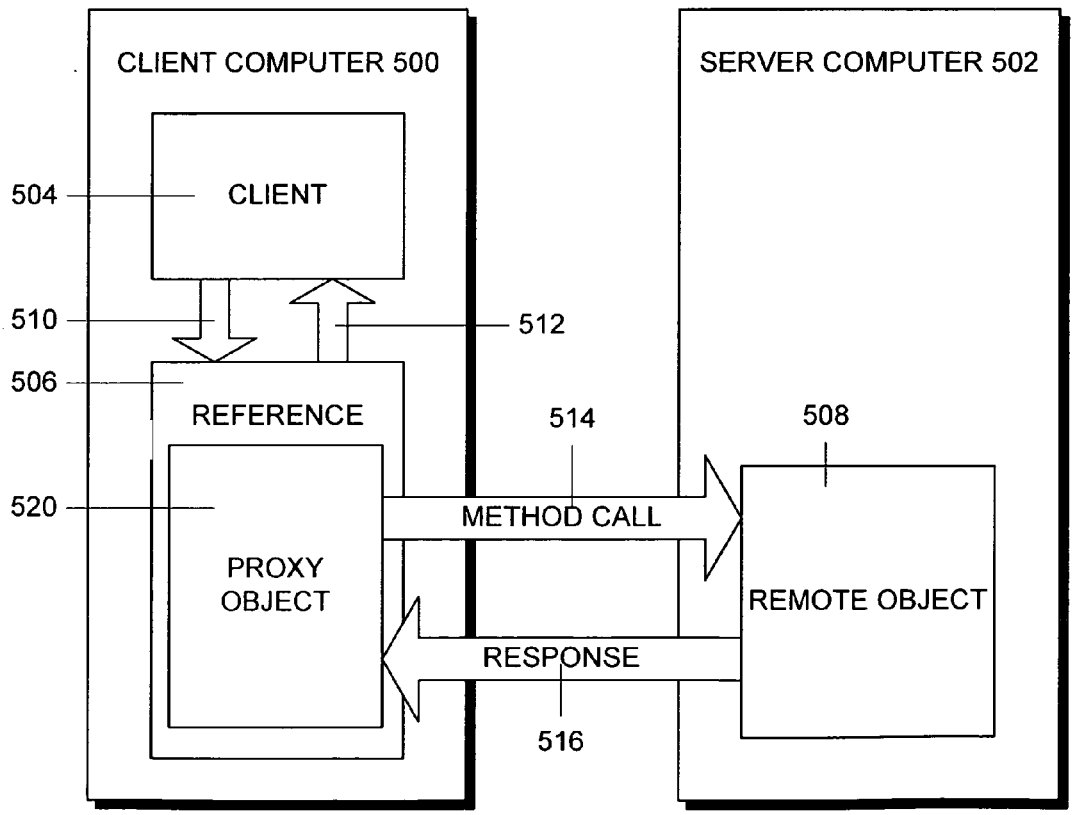
FIG. 5 is a block schematic diagram illustrating a client using a proxy object to retrieve an updated proxy object from a dictionary when a method call fails because the remote object has been moved.

Such an internal proxy object will be used as a cache, much the way a live reference to an activatable object is used in an RMI-JRMP activatable object reference. Calls made to the remote object using the service interface will be dispatched through this internal proxy object, and if the remote object has not been moved since the creation of this proxy object, the method call should succeed. This process is illustrated in FIG. 5. In this arrangement, a client program 504, operating in a client computer 500, often makes a method call on a remote object 508 located in a server computer 502 by means of a reference 506 to that object 508. Specifically, the client program 504 makes a method call on the reference 506 as indicated schematically by arrow 510. The reference 506, in turn, marshals any parameters involved in the call, and then uses the service interface in the proxy object 520 to initiate contact with the remote object 508 and make the method call on that object as indicated schematically by arrow 514. If a response is returned from the remote object 508, as indicated schematically by arrow 516, the proxy object 520 forwards the response to the reference 506. The reference 506 then unmarshals any return values and returns the response to the client 504 as indicated schematically by arrow 512.

Since some implementations of the service interface supported by the proxy object 520 will involve remote method calls, the method calls can fail in a number of ways. For example, there could be a networking or communication failure, as with any remote call. However, method calls made on location-independent references can also fail when the object to which they refer no longer exists at the location to which the current internal proxy object refers. In this case, a failed method call could generate a standard RemoteException (if the machine on which the object had existed is no longer reachable) or a NoSuchObjectException (if the machine is still in existence, but has no record of the object). Some of these exceptions may transient in nature, in which case the proxy object 520 can either retry the method call (perhaps after some predetermined time interval) or pass the exception back to the client 504, allowing the client 504 to decide when (and if) to retry the method call using that proxy object 520.

However, the proxy object 520 might also decide that the exception is an indication that the object to which it refers has been moved. In this case, the proxy object 520 will wrap the exception in a new exception called a StaleProxyException. Like the RemoteException, the StaleProxyException must be declared as being a possible exception value for all methods that might be implemented by an object that exports a location-independent proxy object. Just as the declaration of a RemoteException indicates that a method can be called through a live reference, the declaration of a StaleProxyException indicates that a method may be called through a location-independent proxy object 520.

Once a StaleProxyException has been thrown, the client 504 using that proxy object 520 needs to obtain a new proxy object that refers to the new location of the remote object on which the method call was made. This new proxy object is obtained as shown in FIG. 6 by using the UUID 404 of the remote object, and a service that is made available specifically to support finding updated proxy objects based on the UUID of the remote objects to which those proxy objects refer. This service supports a UuidDirectory interface, which allows the registration and lookup of proxy objects by UUID.

In particular, a remote object 612 will register as indicated schematically by arrow 614 with a UuidDirectory 630 when it is first created, and whenever it is moved from one location to another location. This registration consists of making an entry in the UUID directory 630. The internal structure of the directory 630 is illustrated in FIG. 7. The UUID directory object 700 includes a plurality of entries of which entries 702-712 are illustrated in FIG. 7. Each UUID directory entry for a remote object, such as entry 702, consists of a UUID 714 that has been calculated for that remote object (for example, by using the mechanism described above) and the location 716 of a proxy object that refers to the current location of that remote object. UuidDirectory objects 700 will have the largest scope possible. Ideally, the directory structure would consist of a single UuidDirectory object that includes all locations where either a remote object identified by a UUID could be moved or a location-independent proxy object could be sent. In most cases, several UuidDirectory objects will exist, each with its own distinct scope. Registrations with a UuidDirectory object will be leased and require periodic refreshing by the remote object, so if the remote object either ceases to exist or is moved out of the scope of a UuidDirectory object with which it has registered, the registration for the UUID and proxy object pair corresponding to that remote object in that UuidDirectory object will lapse and automatically be deleted from the UuidDirectory object.

Referring to FIG. 6, with the directory structure 630 in place, when a client 604 catches a StaleProxyException 606, thrown from a method call on a proxy object 620, it will first typecast that proxy object 620 to a BasicRef type which includes two methods. The first method, called getuUid( ), allows the client to obtain the raw UUID 404 of the remote object 612 from the proxy object 620. The second method 406 allows the client 604 to request another updated proxy object to the same remote object 612 to which the proxy 620 that generated the exception 606 referred as indicated schematically by arrow 608. This second method 406, called refreshProxy( ), takes a parameter which acts as a hint to the method. This parameter is the location of a local UuidDirectory object that should be consulted to find a new proxy object for the remote object. The client may obtain this hint in a number of manners. For example, the local UuidDirectory object could be found using a local lookup service, it could be obtained though a membership in a group in which the client resides, or it could be obtained in some other way. The client may even have stored a number of different UuidDirectory objects that could be tried as hints. The refreshProxy( ) method provides the UUID in the proxy object 620 to the UUID directory object 630 specified in the hint as indicated schematically by arrow 632. If the UUID directory 630 contains an entry that includes the UUID sent by the refreshProxy( ) method, the location of an updated proxy object is returned to the proxy object 620 as indicated schematically by arrow 634. The proxy object 620 then returns the updated proxy object to the client 604 as indicated schematically by arrow 606. The client can then use the updated proxy object to make method calls on the remote object 612.

The client must provide a hint because retrieving a new proxy object requires accessing a UuidDirectory object, and some instances of UuidDirectory objects may easily be found in the context provided to the client. The UuidDirectory objects may be rooted in a single directory, but they may also branch in disconnected ways. Further, the set of UuidDirectory objects accessible from one object may not be the same as the set of UuidDirectory objects accessible from another object. Because of this, without a hint, it may be difficult, if not impossible, to locate a suitable UuidDirectory object.

Neither the getUuid( ) method nor the refreshProxy( ) method is implemented in a way that requires delegating the method call to the remote object, as the purpose of these methods is to refresh the proxy object for that remote object. The refreshProxy( ) method of a given proxy object will check with the UuidDirectory object supplied as a parameter by the client, along with any other UuidDirectory objects that might have been cached in the proxy object for that purpose, in an attempt to find a more recent proxy object than itself. The refreshProxy( ) method may modify the existing proxy object by replacing the live reference in that proxy object. Alternatively, the refreshProxy( ) method may return a new proxy object rather than updating the proxy object on which it is called. This latter implementation allows proxy object implementations to be immutable, simplifying the concurrent access to those objects. After a call to a refreshProxy( ) method that returns a new proxy object, the client discards the proxy object on which the method was called and uses the new proxy object that was returned to invoke methods in the remote object.

Figure 8:
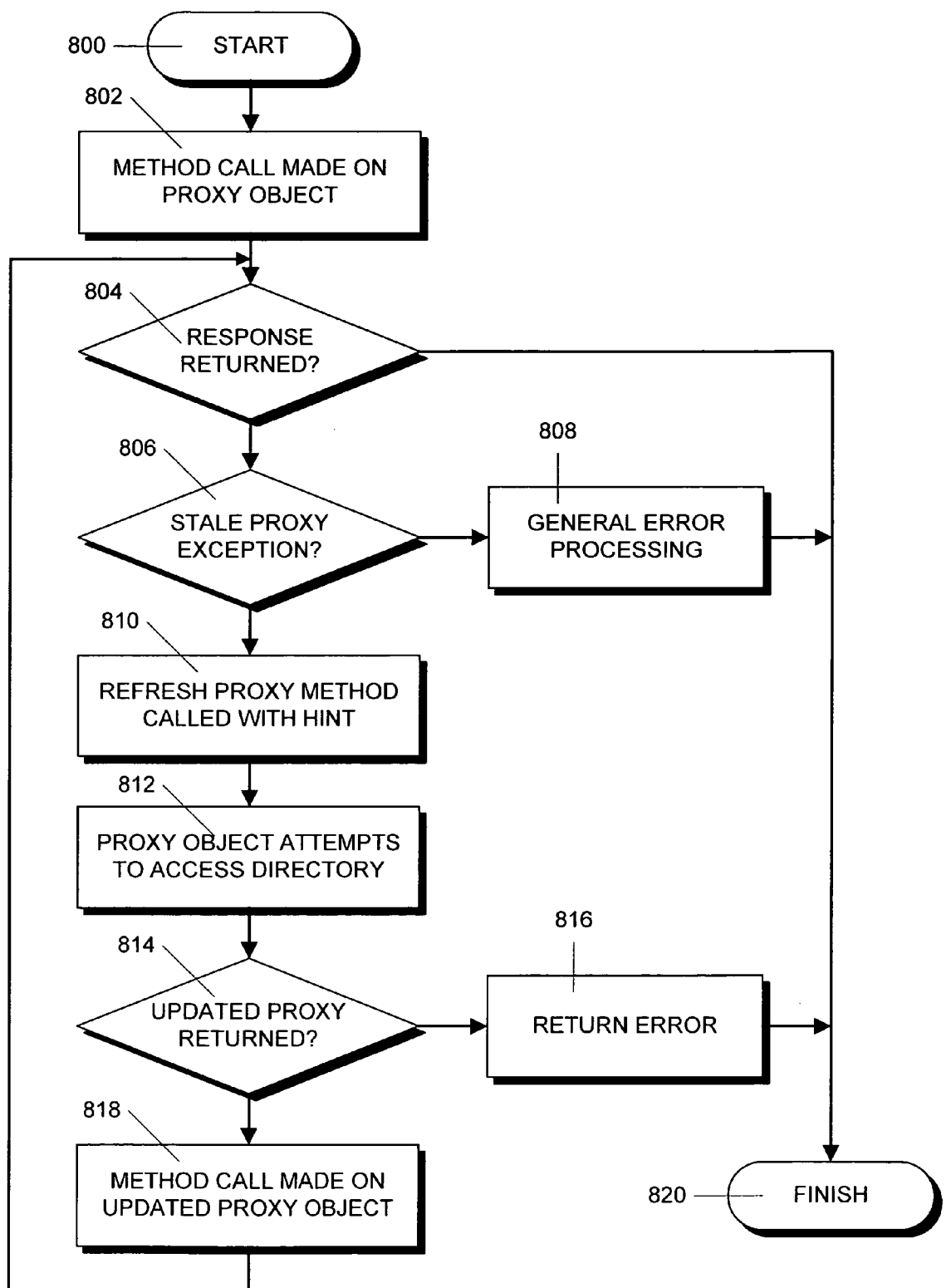
FIG. 8 is a flowchart showing the steps in an illustrative process operating in accordance with the principles of the invention for making a method call on a remote object.

The overall process is illustrated in FIG. 8 which begins in step 800 and proceeds to step 802 where a client makes a method call on a reference that includes a proxy object. In step 804, a determination is made whether the method call has produced a response. If it has, then the process ends in step 820.

If, in step 804, it is determined that the method call has not produced a response, then, in step 806, a determination is made whether an exception has been returned and, in particular, whether a StaleProxyException has been returned. If an exception has been returned, but it is not a StaleProxyException, then in step 808, normal error processing is initiated and the process finishes in step 820.

If, in step 806, it is determined that a StaleProxyException has been returned, then, in step 810, the client calls the refreshProxy( ) method in the current proxy object, passing in the location of a UUID directory as a hint. The current proxy object, via the refreshProxy( ) method attempts to access the specified UUID directory in step 812.

Next, in step 814, a determination is made whether an updated proxy object has been returned from the UUID directory. If an updated proxy object has been returned as determined in step 814, then that proxy object is returned to the client so that the client can make a method call on the updated proxy object in step 818. The process then returns to step 804 to determine whether a response to the method call has been returned.

Alternatively, if in step 814, it is determined that no updated proxy has been returned from the attempt to access the UUID directory, then an error is returned in step 816 and the process finishes in step 820. Operation continues in this manner until either a response is returned or an error occurs.

Although the refreshProxy( ) method is available, the client is not required to use it. Instead, in another embodiment, the client obtains a UUID from the proxy object for which method call failed by typecasting the proxy object to a BasicRef type and using the getUuid( ) method to obtain the UUID of the remote object. However, instead of using the refreshProxy( ) method, the client accesses any available UuidDirectory objects in an attempt to retrieve a different proxy object. However, having a refreshProxy( ) method associated with a proxy object allows the proxy object to contain its own set of hints. For example, a proxy object could be implemented which stores a reference to the UuidDirectory object in which that proxy object was originally registered, on the assumption that, if the remote object to which that proxy object refers is moved, the moved object is likely to move to a machine that is within the scope of the original UuidDirectory object or the scope of a UuidDirectory object that is known to the object being moved.

In addition, instead of introducing a new StaleProxyException exception, in another embodiment, the client responds to any exception that might be thrown when the remote object no longer exists at the location to which a proxy object refers by attempting to retrieve an updated proxy for that remote object.

The non-global nature of UuidDirectory objects means that it is quite possible that the movement of a remote object will invalidate some proxy objects for that remote object in a way that does not allow the holder of the proxy to successfully recover an updated proxy object. For example, assume that a proxy object even contains internal hints about a suitable UuidDirectory object (or even some number of UuidDirectory objects) to contact when that proxy object must be refreshed. Assume further that the remote object, which is the target of that proxy object, is moved to a new location that is in the scope of a new set of UuidDirectory objects. However, the scope of this new set of directory objects is disjoint from the scope of both the UuidDirectory objects that are the subject of the internal hints in the proxy object, and those that are available to the client holding the proxy object. Then, a method call on the proxy object will fail, since the proxy object is no longer valid. An attempt to refresh that proxy object using the UuidDirectory object internal hints that are in the proxy object will fail, since the proxy object has been moved outside the scope of those UuidDirectory objects. Any UuidDirectory object passed into the refreshProxy( ) method as a hint by the client holding the proxy will also be unable to find an updated proxy object, since (by assumption) they are disjoint from the set of UuidDirectory objects that are in the scope of the new location of the object. The client may also get the UUID from the proxy object and try other, application specific, mechanisms to find a more current proxy. But even these might fail. In such a case, the client holding the proxy object will be unable to determine if the remote object has moved in the way described or simply no longer exists. From the point of view of the client object, the proxy object no longer refers to any remote object.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, mechanisms for UUID generation differing from those described may be used. In addition, other techniques for associating UUID directories with proxy objects to allow access to lookup functionality in those directories may be used. The order of the process steps may also be changed without affecting the operation of the invention. Other aspects, such as the specific process flow, as well as other modifications to the inventive concept are intended to be covered by the appended claims.

What is claimed is:

1. A tangible non-transitory computer-readable storage medium having a series of computer instructions fixed thereon, and executable by a computer to cause the computer to perform a method for making a method call on a remote object, comprising:
    (a) constructing a location-independent proxy object that includes (1) a live reference containing a location of the remote object, (2) a universally unique identifier (UUID) which provides a unique global reference to that remote object, and (3) a refresh proxy method;
    (b) making a method call on the remote object using the live reference;
    (c) when the method call made in step (b) fails, using the UUID that is included in the location-independent proxy object to obtain a new reference to the remote object by using the refresh proxy method; and
    (d) using the new reference to make another method call on the remote object.

2. The storage medium of claim 1 wherein step (c) comprises:
    (c1) using at least one identifier directory that contains a mapping between UUIDs and location-independent proxy objects to obtain the new reference.

3. The storage medium of claim 2 wherein step (c1) comprises using the remote object to perform a registration with at least one identifier directory when the remote object is first created and when a remote object is moved from one location to another.

4. The storage medium of claim 3 wherein the remote object periodically refreshes the registration.

5. The storage medium of claim 1 wherein the location-independent proxy object contains hints to facilitate the location of identifier directories.

6. The storage medium of claim 1 wherein step (c) comprises using the location-independent proxy object to inform a client that the remote object has been moved whereupon the client uses the UUID to obtain a new reference to the remote object.

7. The storage medium of claim 6 wherein the location-independent proxy object informs the client that the remote object has been moved by generating a special exception.

8. Apparatus including a programmed computer, the computer including a tangible non-transitory computer-readable storage medium having instructions stored thereon that are executable by the computer for making a method call on a remote object, the instructions implementing:

a reference generator that constructs a location-independent proxy object including (1) a live reference containing a location of the remote object, (2) a universally unique identifier (UUID) which provides a unique global reference to that remote object, and (3) a refresh proxy method;

a call mechanism that makes a method call on the remote object using the live reference;

a lookup mechanism operable when the method call made by the call mechanism fails, that uses the UUID that is included in the location-independent proxy object to obtain a new reference to the remote object by using the refresh proxy method; and a mechanism that uses the new reference to make another method call on the remote object.

9. The apparatus of claim 8 wherein the lookup mechanism comprises a directory mechanism that uses at least one identifier directory, which contains a mapping between UUIDs and location-independent proxy objects, to obtain the new reference.

10. The apparatus of claim 9 wherein the directory mechanism comprises a registration mechanism that uses the remote object to perform a registration with at least one identifier directory when the remote object is first created and when a remote object is moved from one location to another.

* * * * *